United States Patent
Yoshinaka

[19]

[11] Patent Number: 6,134,880
[45] Date of Patent: Oct. 24, 2000

[54] TURBINE ENGINE WITH INTERCOOLER IN BYPASS AIR PASSAGE

[75] Inventor: Tsukasa Yoshinaka, Quechee, Vt.

[73] Assignee: Concepts ETI, Inc., White River Junction, Vt.

[21] Appl. No.: 09/002,018

[22] Filed: Dec. 31, 1997

[51] Int. Cl.⁷ .............................. F02C 7/143; F02K 3/00
[52] U.S. Cl. .......................... 60/226.1; 60/266; 60/728; 60/39.75
[58] Field of Search .................... 60/226.1, 266, 60/728, 39.07, 39.75

[56] References Cited

U.S. PATENT DOCUMENTS

| | | | |
|---|---|---|---|
| Re. 23,639 | 3/1953 | Lagelbauer | 60/35.6 |
| 2,526,409 | 10/1950 | Price | 170/135.27 |
| 2,575,683 | 11/1951 | Price | 60/35.6 |
| 2,603,948 | 7/1952 | Mims | 60/39.52 |
| 3,299,639 | 1/1967 | Lagelbauer | 60/226 |
| 3,358,457 | 12/1967 | Caldwell et al. | 60/266 |
| 3,528,250 | 9/1970 | Johnson | 60/261 |
| 3,811,495 | 5/1974 | Laing | 165/85 |
| 4,254,618 | 3/1981 | Elovic | 60/226 R |
| 4,424,667 | 1/1984 | Fanning | 60/39.181 |
| 4,474,001 | 10/1984 | Griffin et al. | 60/204 |
| 4,561,246 | 12/1985 | Hovan | 60/226.1 |
| 4,896,499 | 1/1990 | Rice | 60/728 |
| 4,991,394 | 2/1991 | Wright | 60/226.1 |
| 5,123,242 | 6/1992 | Miller | 60/226.1 |
| 5,163,285 | 11/1992 | Mazeaud et al. | 60/39.75 |
| 5,203,163 | 4/1993 | Parsons | 60/226.1 |
| 5,269,133 | 12/1993 | Wallace | 60/204 |
| 5,269,135 | 12/1993 | Vermejan et al. | 60/226.1 |
| 5,272,870 | 12/1993 | Grieb et al. | 60/267 |
| 5,363,641 | 11/1994 | Dixon et al. | 60/39.02 |
| 5,581,996 | 12/1996 | Koch et al. | 60/266 |
| 5,697,208 | 12/1997 | Glezer et al. | 60/39.07 |
| 5,937,633 | 8/1999 | Wang | 60/728 |

*Primary Examiner*—Ted Kim
*Attorney, Agent, or Firm*—Downs Rachlin & Martin PLLC

[57] ABSTRACT

A turbine engine (20) having bypass and core passages (30 and 40), a high pressure compressor (80) for compressing air in the core passage and an intercooler (120, 220) for cooling core air (42) in the core passage prior to discharge by the high pressure compressor. The intercooler includes a plurality of heat exchange elements (140) positioned in the bypass passage through which all or a portion of the core air is transported. Heat in the core air is transferred via the heat exchange elements to the relatively cool bypass air, thereby cooling the core air and heating the bypass air. The turbine engine may have a counterflow intercooler (120), a radial flow intercooler 220 or an intercooler of other configuration. The turbine engine may have a high pressure compressor with two sections (82 and 86), with core air transported to and from the intercooler between sections, or a single section high pressure compressor, with core air transported to and from the intercooler upstream of the high pressure compressor. The turbine engine may be of turbofan, turboshaft, turboprop or other design.

26 Claims, 7 Drawing Sheets

TURBINE ENGINE WITH INTERCOOLER IN BYPASS AIR PASSAGE

FIELD OF THE INVENTION

The present invention relates to turbine engines, and more particularly to turbine engines having core and bypass air passages and an intercooler for cooling relatively hot core air using relatively cool bypass air.

BACKGROUND OF THE INVENTION

The desire for improved performance and fuel efficiency in turbofan and other turbine engines has produced continuous improvement in the specific thrust and specific fuel consumption of such engines. Specific thrust is determined by dividing the pounds of thrust produced by the turbine engine by the pounds of the total (core and bypass) mass flow of air the engine "swallows." Specific fuel consumption is determined by dividing the pounds of fuel consumed per hour by the turbine engine divided by the pounds of thrust produced by the engine.

Specific thrust may be increased and specific fuel consumption may be decreased by increasing the cycle pressure ratio ("CPR") of the turbine engine. CPR is determined by dividing the pressure of air exiting the high pressure compressor of the engine by the pressure of the air at the inlet of the turbine engine. For aircraft turbofan engines, the most advanced production engines for subsonic civilian and military aircraft have CPRs of about 40–45 and the most advanced production engines for supersonic military aircraft have CPRs of about 20–25.

Cycle analysis indicates increases in CPR beyond today's levels results in a further increase in turbine engine performance. Also, the full performance benefits of increased CPR may be realized when combined with increased turbine inlet temperature ("TIT"), i.e., the temperature of the gases at the inlet of the high pressure turbine downstream from the combustion chamber. Unfortunately, limitations in materials make it difficult to achieve such an increase in CPR and TIT.

There are two major locations at which the limitations in materials capability prevent further increases in CPR and TIT beyond the today's level. One of the locations is in the downstream half of the high pressure compressor. Although high temperature resistant materials such as nickel alloys are used today in this half for compressor blades, disks and conical, torque-transmitting diaphragm (or shaft), a further increase of core air temperature would reduce creep life of these components to an unacceptable extent.

The second major location where materials limitations prevent increases in CPR is the high pressure turbine. Today, the state-of-the-art level of TIT is 2,800° F. to 3,200° F. at maximum turbine engine load, e.g., during aircraft take-off. These values are achievable only by cooling the high pressure turbine components, such as nozzle vanes, blades, disks and shrouds which are made from high temperature resistant materials such as nickel alloys, with a portion of the high pressure compressor delivery air ("T3 air"). With this cooling, higher TIT can be accommodated. For example, U.S. Pat. No. 5,269,133 to Wallace describes a turbofan engine in which a relatively small portion (i.e., about 10%) of the T3 air is transported radially from the core passage through a heat exchanger in the bypass passage and then is returned radially to a manifold that delivers the relatively cooled air to the high pressure turbine.

However, increasing the compression ratio of the high pressure compressor in an attempt to increase CPR beyond today's level would result in a temperature increase in the high pressure compression delivery flow. This in turn would necessitate an increased delivery of cooling air flow to the high pressure turbine to maintain creep life of the turbine components at the today's level at current maximum TITs. An increase of turbine cooling air flow reduces the effective use of the core flow to generate engine thrust, which deteriorates engine performance. The point has been reached in current attempts to increase engine performance by increasing TIT where deterioration of engine performance due to the further increase of turbine cooling air flow overcompensates the cycle benefits the increased TIT would otherwise provide. As such, the desire to achieve future CPRs in the range of 70 for high fan pressure ratio, low bypass ratio engines of the type used for supersonic aircraft and 100 for low fan pressure ratio, high bypass ratio engines of the type used for subsonic aircraft is thwarted.

It is known to use a small amount of the core air prior to delivery to the high pressure compressor of aircraft turbo fan engines for bearing sealing, engine anti-icing, high pressure compressor and low pressure turbine cooling, and the environmental control system ("ECS") or for aircraft cabin air supply. As used herein, this portion of core air flow is referred to as bleed mass flow.

SUMMARY OF THE INVENTION

One aspect of the present invention is a turbine engine comprising a core air passage through which core air flows and a bypass air passage through which bypass air flows. The engine includes an intercooler connected to the core air passage and constructed to transport more than a mass flow bleed amount of the core air comprising at least twelve percent, by mass, of the core air, from the core air passage through the bypass air passage and back to the core air passage.

Another aspect of the present invention is a turbine engine comprising a core air passage for transporting a flow of core air, a bypass air passage for transporting a flow of bypass air and a high pressure turbine. In addition, the engine includes an intercooler means connected to the core air passage for cooling at least a portion of the flow of core air sufficiently that delivery of at least some of the cooled core air to the high pressure turbine permits TITs in excess of 3,200° F.

Yet another aspect of the present invention is a turbine engine comprising a core air passage for transporting a flow of core air, a bypass air passage for transporting a flow of bypass air and a high pressure compressor for compressing the core air and discharging the compressed core air through an outlet. In addition, the engine includes an intercooler connected to the core air passage and constructed to transport at least a portion of the core air from the core air passage through the bypass air passage and back to the core air passage prior to discharge of said compressed core air through said outlet so as to cool the core air. The high pressure compressor is designed to compress the core air sufficiently that the engine has a CPR of at least 50 in subsonic applications and at least 30 in supersonic applications.

One advantage of the present invention is that it permits the attainment of relatively high CPRs in turbofan aircraft engines using known materials, i.e., well beyond current state-of-the-art levels up to a CPR of 70 for high fan pressure ratio, low bypass ratio engines and 100 for low fan pressure ratio, high bypass ratio engines.

Another advantage of the present invention is that it provides T3 air to the high pressure turbine of a turbine engine that is cooled sufficiently to permit TIT to be increased beyond current levels without increasing the flow of turbine cooling air.

Yet another advantage of the present invention is that it achieves cooling of core air entirely within the turbine cycle of the engine, which maximizes the specific thrust and reduces the specific fuel consumption of the engine.

BRIEF DESCRIPTION OF THE DRAWINGS

These and other advantages and aspects of the present invention are described in more detail below and are illustrated in the associated drawings where.

DETAILED DESCRIPTION OF THE INVENTION

The present invention is a turbine engine having core and bypass air passages and an intercooler for cooling most or all of the core air in the core air passage using the relatively cool bypass air in the bypass air passage. The intercooler may have various designs including counterflow and radial flow designs. The turbine engine may have a dual section high pressure compressor, in which case core air is transported to and from the intercooler between sections of the high pressure compressor. Alternatively, the turbine engine may have a boost compressor, or a low pressure compressor, in which case core air is transported to and from the intercooler upstream of the high pressure compressor. A portion of the T3 air is directed via a conduit to the high pressure turbine to cool the latter, thereby accommodating higher TITs.

While the present invention has particular application in turbofan aircraft engines, it is also applicable to turboprop and turboshaft engines and other gas turbine engines having two separate gas paths, core and bypass.

Figure 1:
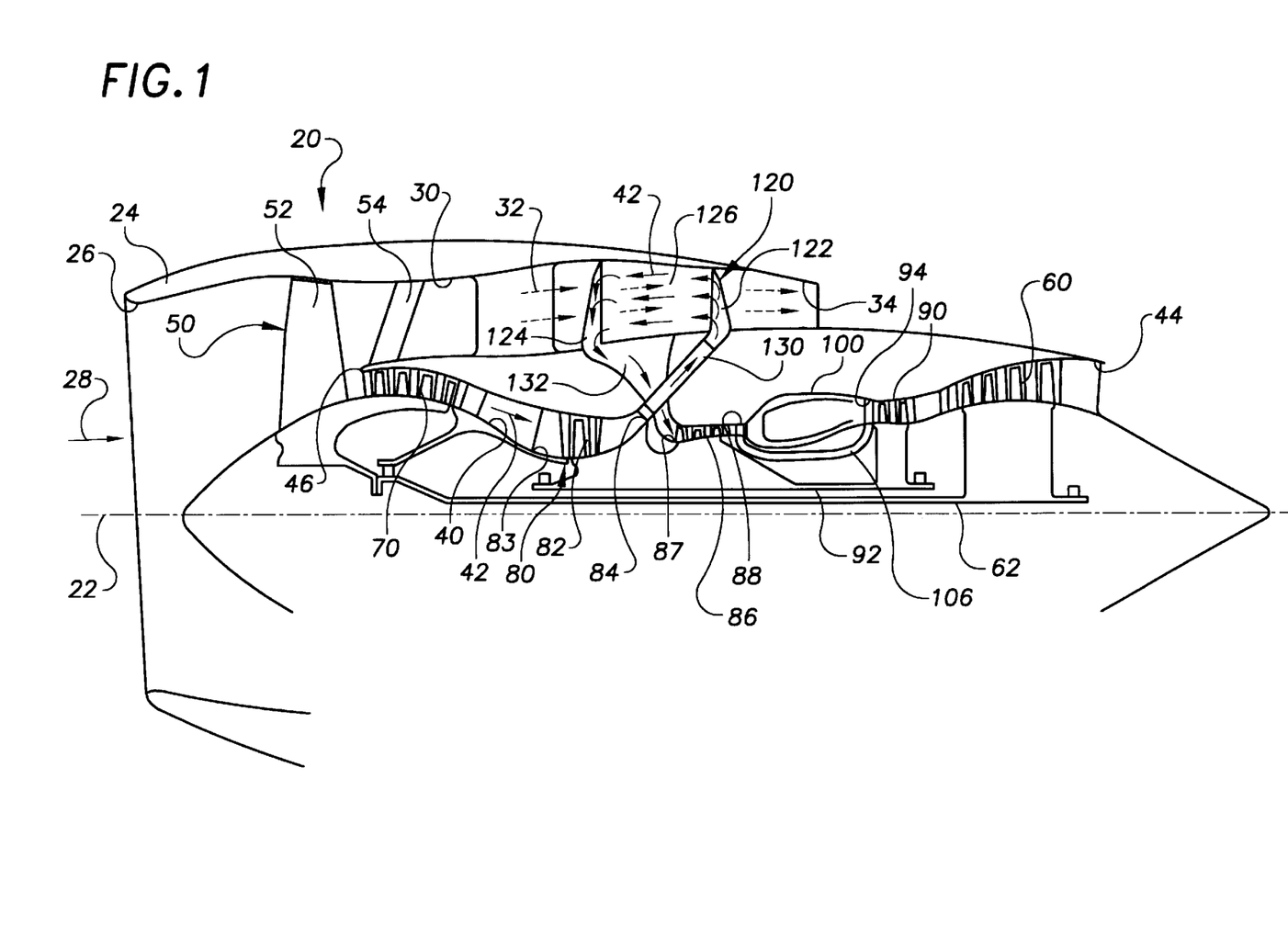
FIG. 1 is a cross-sectional view of the turbofan engine of the present invention, having an intersection, counterflow intercooler.

Referring to FIG. 1, one aspect of the present invention is a turbofan engine 20 having a longitudinal axis 22, a hollow outer housing 24 and an inlet 26 through which incoming air 28 flows. Engine 20 has a bypass passage 30 through which bypass air 32 flows. Bypass air 32 is represented in the FIGS. by an arrow with a dotted-line shaft. The latter is exhausted from bypass passage 30 through bypass exhaust nozzle 34. Engine 20 also has a core passage 40 through which core air 42 flows. The latter is exhausted from core air passage 40 through core exhaust nozzle 44. Core air 42 is represented in the FIGS. by an arrow with a solid-line shaft. Incoming air 28 is directed into bypass air passage 30 and core air passage 40 by splitter 46.

Engine 20 has a fan 50 positioned in housing 24 upstream of bypass passage 30 and core passage 40 for providing initial pressurization of bypass air 30 and core air 42. Fan 50 is mounted for rotation about axis 22. Fan 50 includes a plurality of rotor blades 52 and stator vanes 54. Fan 50 is driven by low pressure turbine 60 positioned at the downstream end of core air passage 40 just upstream of core exhaust nozzle 44, and mounted for rotation about axis 22. As used herein, "upstream" means relatively closer to engine inlet 26 and "downstream" means relatively closer to bypass exhaust nozzle 34 or core exhaust nozzle 44, as the context requires. Rotational movement of low pressure turbine 60 is transmitted to fan 50 via shaft 62.

Engine 20 also preferably, but not necessarily, includes a low pressure compressor 70 positioned in core passage 40 immediately downstream from splitter 46. Low pressure compressor 70 is mounted for rotational movement about axis 22. Low pressure compressor 70 is also connected to shaft 62 and so may be rotationally driven by low pressure turbine 60 or may be rotationally driven by another turbine (not shown) located between low pressure turbine 60 and high pressure turbine 90. Low pressure compressor 70 provides additional pressurization of core air 42.

In addition, engine 20 has a high pressure compressor 80 positioned in core passage 40 downstream of low pressure compressor 70. High pressure compressor 80 is mounted for rotational movement about axis 22. High pressure compressor 80 has a first section 82 with an inlet 83 and an outlet 84 and a second section 86 with an inlet 87 and an outlet 88. High pressure compressor 80 is driven by high pressure turbine 90 positioned in core passage 40 immediately upstream of low pressure turbine 60. High pressure turbine 90 is mounted for rotation about axis 22, and is connected to shaft 92 via which it transmits rotational drive to high pressure compressor 80. High pressure turbine 90 has an inlet 94 at its upstream end. Alternatively, high pressure turbine 90 may be used to drive second section 86 and a second turbine and shaft (not shown) may be used to drive first section 82.

Engine 20 further comprises a combustion chamber 100 in core passage 40 between high pressure compressor second section 86 and high pressure turbine 90. Combustion chamber 100 is positioned so that T3 air is exhausted from second section outlet 88 directly into the combustion chamber. Engine fuel is delivered to combustion chamber 100 from a source (not shown), where it combines with T3 air to create a gas jet, as described in more detail below. A conduit 106 is connected to core passage 40 at second section outlet 88 and at high pressure turbine inlet 94 so as to permit a portion of the T3 air to be delivered to high pressure turbine 90 for cooling, as also described in more detail below.

Figure 2:
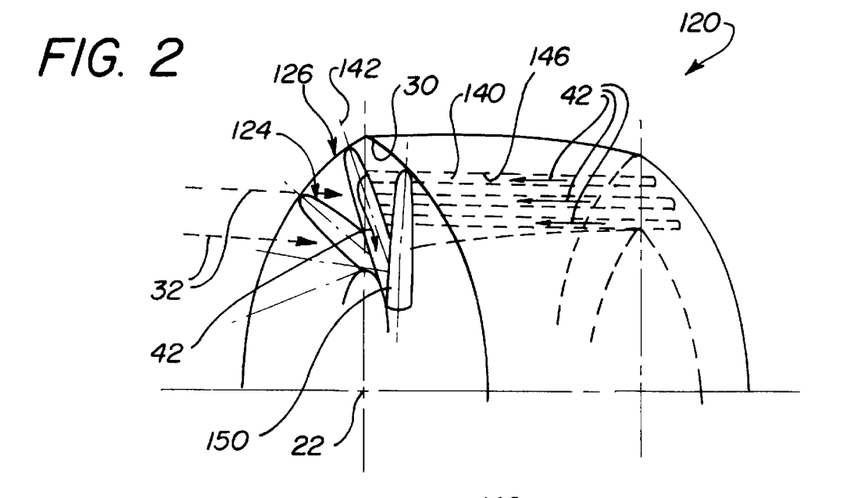
FIG. 2 is an idealized, partial perspective view of the intercooler shown in FIG. 1.

Referring now to FIGS. 1 and 2, engine 20 also includes a counterflow intercooler 120. The latter has an inlet header 122, an outlet header 124 and a heat exchange section 126 positioned between the inlet and outlet headers. Outlet 84 of first section 82 is connected with inlet header 120 via diffuser 130 which extends radially outwardly and in a downstream direction from outlet 84. Core air 42 exhausted from high pressure compressor first section 82 is thus transported via hollow diffuser 130 to inlet header 120. Outlet header 124 is connected with inlet 87 of high pressure compressor second section 86 via hollow collector 132 which extends radially inwardly and in a downstream direction toward inlet 87. Core air 42 exhausted from heat exchange section 126 is thus transported via outlet header 124 and collector 132 to high pressure compressor second section 86.

Figure 3:
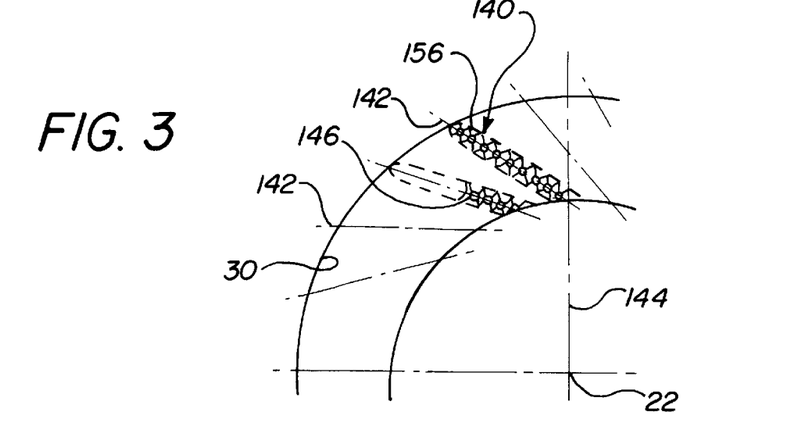
FIG. 3 is an idealized, partial front view of the intercooler shown in FIG. 2, with only several of the pipe-and-fin heat exchange elements being shown for clarity of illustration.
Figure 4:
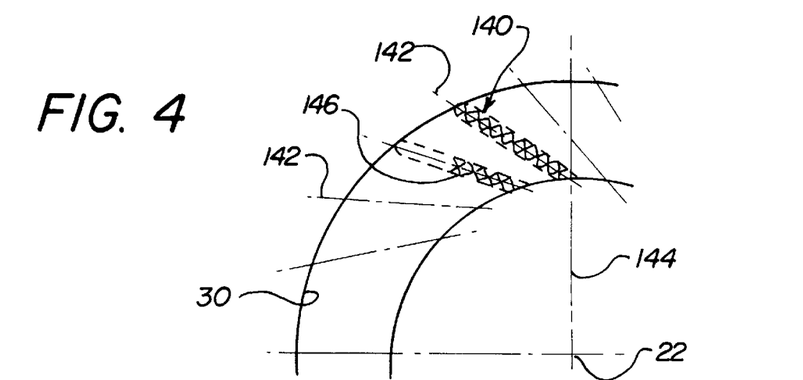
FIG. 4 is similar to FIG. 3, except that the heat exchange elements have a corrugated sheet construction.

Referring to FIGS. 1–4, heat exchange section 126 of counterflow intercooler 120 includes a plurality of elongate heat exchange elements 140 that extend substantially parallel to axis 22 (see FIG. 2). Groups of elements 140 are aligned in contact with one another, or in closely spaced relationship, along axes 142 (FIGS. 2–4). Preferably, axes 142 extend transversely with respect to radii 144 (FIGS. 3 and 4) extending perpendicular to axis 22, i.e., axes 142 extend in dihedral configuration. More specifically, the placement of axes 142 are preferably selected so as to introduce as little change in direction to core air 42 entering heat exchange section 126 as possible. However, in some cases, it may be desirable to position axes 142 to extend radially from axis 22 or in other geometric relation to axis 22. For clarity of illustration, heat exchange elements 140 are not shown in FIG. 1, and only several of the elements are illustrated in FIGS. 2–4. It is to be appreciated that heat exchange elements 140 extend along axes 142 which are preferably relatively closely spaced around the entire circumference of bypass passage 30.

Each heat exchange element 140 has a hollow interior 146. Outlet header 124 has a plurality of elongate hollow manifolds 150 (FIG. 2), the interiors of which are in fluid communication with interiors 146. The long dimension of each manifold 150 extends along an axis 142, whereby interiors 146 of all the heat exchange elements 140 aligned with a given axis 142 are in fluid communication with a corresponding respective manifold extending along the given axis 142. The hollow interiors (not labeled) of manifolds 150 are closed off at radially outermost ends are the radially innermost ends of the hollow interiors are in fluid communication with collector 132.

Although not illustrated, inlet header 122 includes a plurality of elongate manifolds that are substantially identical to manifolds 150. Thus, each manifold of inlet header 122 extends along an axis 142 and the hollow interior thereof is in fluid communication with interiors 146 of the heat exchange elements 140 aligned on such axis 142. The interiors of the manifolds of inlet header 122 are also in fluid communication with diffuser 130.

Referring to the embodiment of heat exchange elements 140 illustrated in FIG. 3, fins 156 are attached to heat exchange elements 140 to facilitate heat transfer. The present invention encompasses fins 156 having a variety of configurations. It is preferred, however, that fins 156 be configured so as to create as little pressure loss and as much heat exchange in bypass passage 30 as possible.

In the alternative embodiment of heat exchange elements 140 illustrated in FIG. 4, the elements are created by bringing corrugated sheets of material into contact so that the peaks and valleys of one sheet of material are positioned opposite corresponding respective peaks and valleys of the opposite sheet of material. Hollow interiors 146 are formed between the peaks of the opposing sheets of material. Heat transfer fins (not shown) may or may not be used, as desired.

Heat exchange elements 140, inlet header 122, outlet header 124 and other portions of counterflow intercooler 120 are preferably made from materials that provide an appropriate balance of strength, heat transfer capability, minimal weight, resistance to creep and impact damage at temperatures in the range 600° F. to 1,500° F., and other factors known to those skilled in the art. Suitable materials for counterflow intercooler 120 include titanium and carbon—carbon composites.

While intercooler 120 has been described as comprising a counterflow design, the present invention encompasses an intercooler for transporting core air 42 in the same direction as bypass air 32. In this case, diffuser 130 extends radially outwardly and in a slightly upstream direction and is attached to exit header 124 (which would then be referred to as an inlet header), and collector 132 extends radially inwardly and in a slightly downstream direction and is attached to inlet header 122.

In FIG. 1 the entire mass flow of core air 42 exhausted from high pressure compressor first section 82 is shown transported via diffuser 130 to counterflow intercooler 120. Maximum cooling of T3 air is accomplished under such conditions, as described in more detail below. However, it is to be appreciated that a relatively small portion of core air 42 may be used as mass bleed flow prior to delivery of the core air to intercooler 120. As is known, such bleed mass flow may be used for, among other things, bearing sealing, engine anti-icing, compressor and/or low pressure turbine cooling, and environmental control system ("ECS") or for aircraft cabin air supply. Thus, the present invention encompasses: (a) the transport of all the core air 42 in core air passage 40 to counterflow intercooler 120, (b) the transport of 80% to 98% of the core air in the core air passage to the counterflow intercooler, with the remainder being used as bleed mass flow for various purposes, as described above, and (c) the transport of more than the maximum bleed mass flow known in the art, i.e., more than about 10–12%, of the core air in core air passage to the counterflow intercooler. This 10–12% bleed mass flow amount does not include compressor section matching at off-design conditions or the use of high pressure compressor delivery air.

In connection with the following description of turbofan engine 20, reference should be made to FIGS. 1–4. Incoming air 28 enters hollow housing 24 via inlet 26 and is then lightly pressurized by rotor blades 52 and stator vanes 54 of fan 50. This pressurized air is then split by splitter 46 into bypass air 32 traveling in passage 30 and core air 42 traveling in passage 40. Core air 42 is then further pressurized by low pressure compressor 70. First section 82 of high pressure compressor 80 further pressurizes core air 42. As a result of the pressurization of core air 42 imparted by these compressors, the temperature of the core air is increased substantially, e.g., to about 600° F. to 1,500° F. The core air 42 is then exhausted via outlet 84 where it travels radially outwardly and in a downstream direction through diffuser 130 into inlet header 122.

Next, core air 42 travels outwardly along axes 142 of the manifolds (not shown) of inlet header 122 and into hollow interiors 146 of heat exchange elements 140. Then, core air 42 travels substantially parallel to axis 22 through hollow interiors 146 in a direction opposite that of core air 32 in core passage 30. Thermal energy in core air 42 is transferred to heat exchange elements 140, including fins 156 in the case of the FIG. 3 embodiment of the present invention. Bypass air 32, which is relatively cool as compared to core air 42 in heat transfer elements 140 since it is at a lower pressure, travels through the heat transfer elements. As a result, heat is transferred to bypass air 32, which cools heat transfer elements 140, which in turn cools core air 42 traveling through the heat transfer elements. The heated bypass air 32 continues traveling through bypass passage 30 and is ultimately discharged as a low-pressure jet of air through bypass exhaust nozzle 34. Of course, if intercooler 120 does not feature a counterflow design, as discussed above, core air 42 flows through the intercooler in the same direction as bypass air 32.

Core air 42 exits heat transfer elements 140, and travels through manifolds 150 of outlet header 124 into collector 132. From there, core air 42 is delivered to second section 86 of high pressure compressor 80 where it is further pressurized and then discharged into combustion chamber 100. Fuel is introduced into combustion chamber 100 which reacts with the highly pressurized core air 42 to create a gas jet which is exhausted from the combustion chamber into inlet 94 of high pressure turbine 90. This gas jet causes high pressure turbine 90 to rotate, thereby causing shaft 92 to rotate which in turn transmits rotational drive to high pressure compressor first section 82 and second section 86.

A small portion, e.g., 5% to 20%, of the T3 air discharged from second section 86 of high pressure compressor is transported via conduit 106 to inlet 94 of high pressure turbine 90. Due to the substantial amount of heat that is extracted from core air 42 during its passage through counterflow intercooler 120, the T3 air delivered via conduit 106 to turbine 90 is significantly lower than the TIT of the gas jet. As such, this T3 air cools high pressure turbine 90 considerably. Indeed, projections suggest that one Fahrenheit degree decrease of T3 air, which is delivered via conduit 106, permits the increase of TIT by 2 to 3 Farenheit degrees without a change in metal temperature of the high pressure turbine 90. This in turn allows engine 20 to accommodate TITs that are about 800–1,200° F. higher than known materials could otherwise tolerate, which allow significantly higher CPRs. Specific thrust increases and specific fuel consumption decreases with increases in CPR and TIT.

Following discharge from high pressure turbine 90, the gas jet then causes low pressure turbine 60 to rotate. This rotational movement is transmitted via shaft 62 to fan 50 and low pressure compressor 70, causing the fan and compressor to rotate. Finally, the gas jet is exhausted via core exhaust nozzle 44.

The heat transferred to bypass air 32 increases the thrust of engine 20 in two primary ways. First, the heated bypass air 32 has increased velocity which increases thrust insofar as thrust=mass×velocity. Second, by delivering relatively cool core air 42 to second section 86 of high pressure compressor 80, the core air is more dense. As such, less work is required to achieve the desired pressurization of the core air in second section 86 of high pressure compressor 80. Therefore, high pressure turbine 90 does not have to work as hard, which means a greater portion of the total energy in the gas jet exhausted from combustion chamber 100 is available (a) to drive fan 50 and low pressure compressor 60 and/or (b) as thrust at core exhaust nozzle 44. Delivery of this excess energy to fan 50 and low pressure compressor 60 permits the use of a larger fan 50, which in turn increases the bypass ratio of engine 20, thereby increasing engine thrust.

Figure 5:
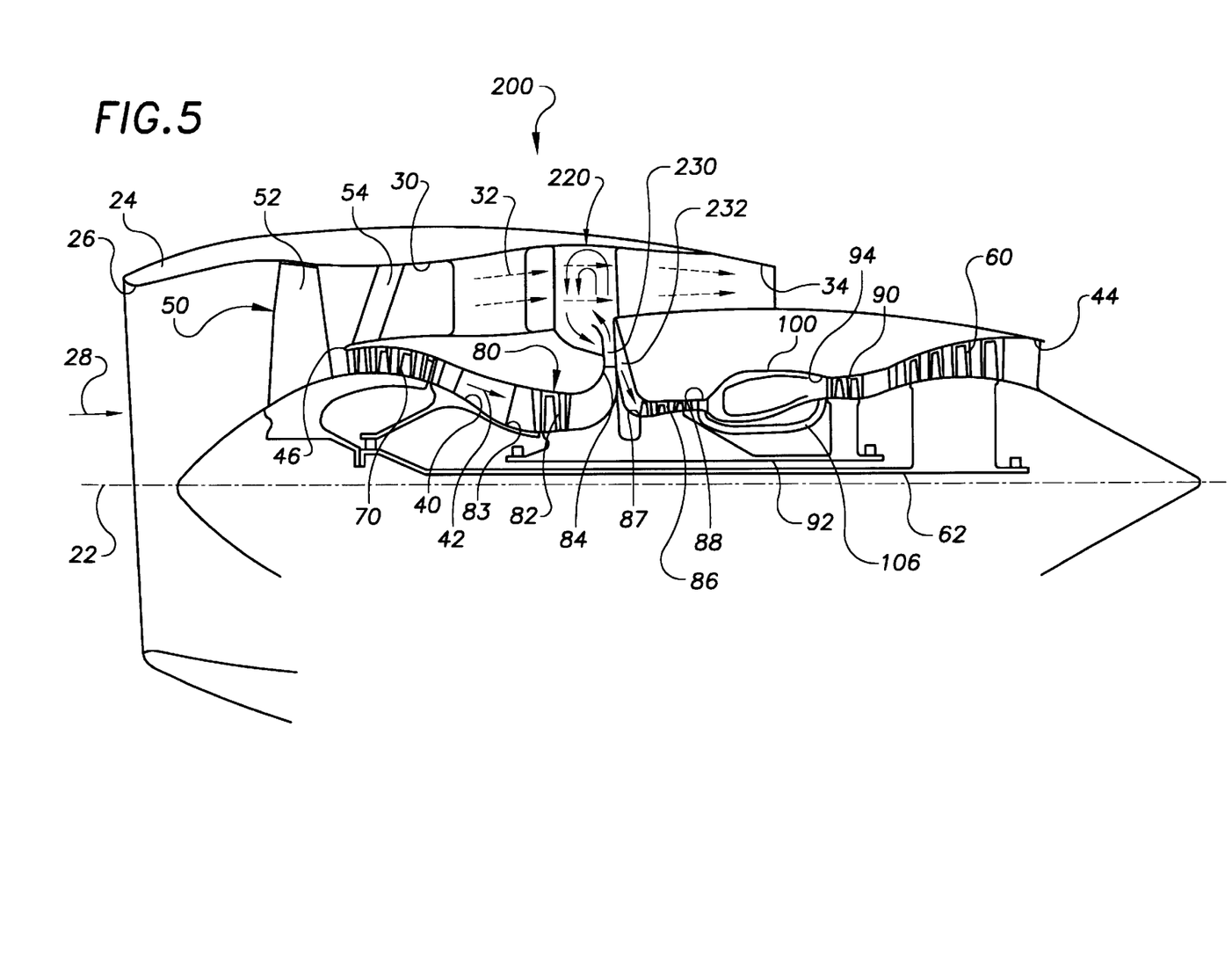
FIG. 5 is a cross-sectional view of the turbofan engine of the present invention, having an intersection radial flow intercooler.

Referring now to FIG. 5, another aspect of the present invention is a turbofan engine 200 having a radial flow intercooler 220. With the exception of intercooler 220, as described in more detail below, engine 200 is identical to engine 20. Thus, reference should be made to the preceding description of engine 20 in connection with the following description of engine 200 for a fuller understanding of engine 200.

Intercooler 220 includes a hollow diffuser 230 connected with outlet 84 of first section 82 of high pressure compressor 80. Diffuser 230 extends radially outwardly relative to axis 22 and transports compressed core air exhausted from first section 82 radially outwardly. Intercooler 220 also includes a hollow collector 232 connected with inlet 87 of first section 86. Collector 232 extends radially inwardly relative to axis 22 and in a downstream direction and transports core air radially inwardly and in a downstream direction.

Figures 6, 7:
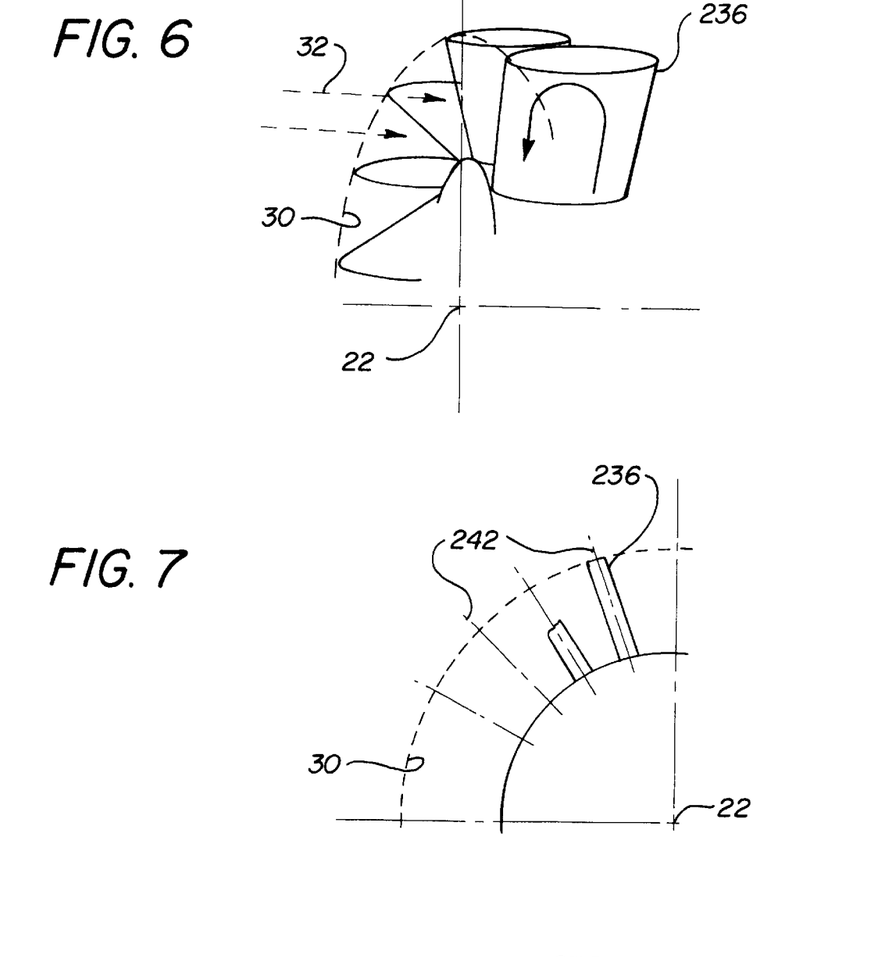
FIG. 6 is an idealized, partial perspective view of the intercooler of FIG. 5.
FIG. 7 is an idealized, partial front view of the intercooler of FIG. 6, in which the heat exchange elements extend radially.
Figure 8:
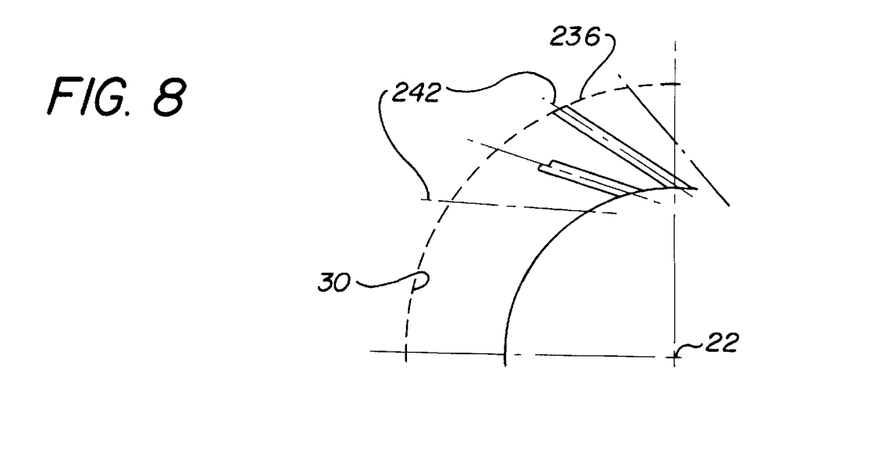
FIG. 8 is similar to FIG. 7, except that the heat exchange elements extend dihedrally.

Intercooler 220 also includes a plurality of heat exchange columns 236 positioned in bypass passage 30, several of which are illustrated in idealized perspective view in FIG. 6. Each column 236 has an airfoil cross-sectional configuration so as to minimize pressure losses in bypass air 32 (see FIG. 6) flowing past the column. In addition, each column 236 extends outwardly along an axis 242. In one embodiment of columns 236, illustrated in FIG. 7, axes 242 extend radially outwardly from axis 22. In another embodiment of columns 236, illustrated in FIG. 8, axes 242 extend outwardly in dihedral configuration so as to introduce as little change in direction to core air 30 flowing into heat exchange column 236 from diffuser 130 as possible. Other placement of axes 242 is also encompassed by the present invention.

Figure 9:
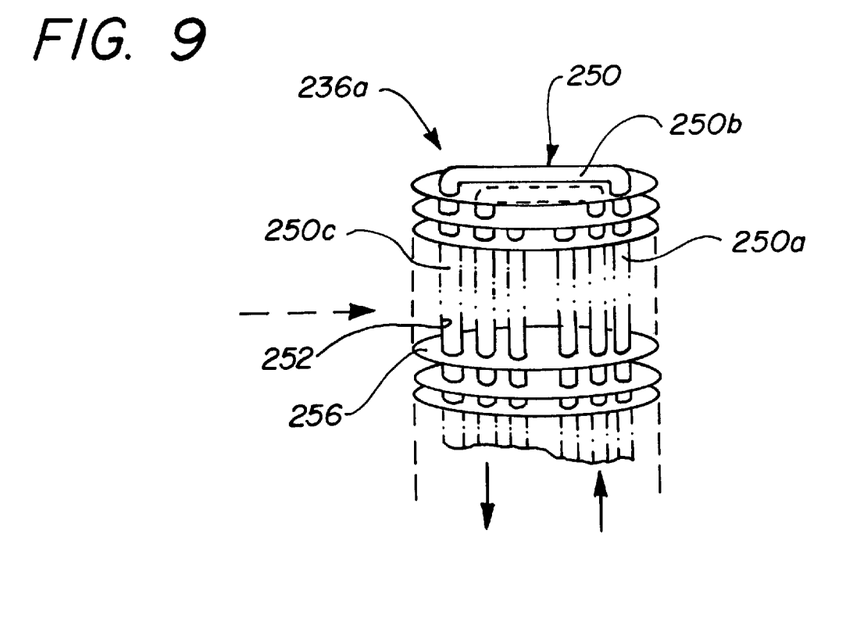
FIG. 9 is a perspective view of one embodiment of the heat exchange elements of the intercooler of FIG. 6, with only several of the heat exchange pipes and fins being shown for clarity of illustration.

Heat exchange columns 236 may include various structure for accomplishing heat exchange between core air 42 and bypass air 32. Referring to FIG. 9, columns 236*a* may include a plurality of heat exchange elements 250, each having a hollow interior 252. Each element 250 includes portions 250*a* and 250*b* that extend radially outwardly along axes 242 and a connecting portion 250*c*. Hollow interiors 252 of heat exchange elements 250 are connected to the hollow interiors of diffuser 230 and collector 232. As described in more detail below, core air 42 delivered via diffuser 230 is transported radially outwardly in interior 252 of portion 250*a*, is transported substantially parallel to axis 22 in the interior of portion 250*c* and is then transported radially inwardly in the interior of portion 250*b* for discharge into the interior of collector 232.

A plurality of fins 256 are attached to heat exchange elements 250 to enhance heat transfer. For clarity of illustration, only several of the fins 256 are illustrated in FIG. 9. However, it is to be appreciated fins 256 are relatively closely spaced along the length of heat exchange element portions 250*a* and 250*b*. While the present invention encompasses fins 256 of various configurations, the fins preferably have an airfoil configuration so as to minimize pressure reduction in bypass air 32 flowing past the fins. In this regard, the representation of columns 236 in FIG. 6 as comprising a continuous outer surface is merely an idealized representation of the embodiment of the columns illustrated in FIG. 9. In reality, heat exchange elements 250 and fins 256 are not sheathed with an outer cover. Instead, the outer edges of fins 256 define the outer boundary of columns 236*a*.

Figure 10:
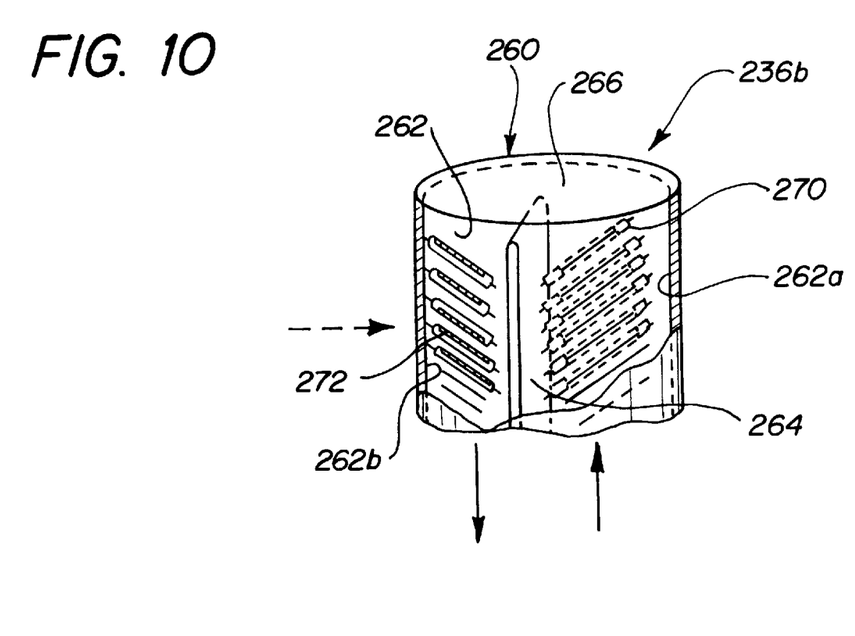
FIG. 10 is a perspective view of another embodiment of the heat exchange elements of the intercooler of FIG. 6, with only several of the heat exchange promoting plates being shown for clarity of illustration and with a portion of the outer housing being removed for clarity of illustration.

In another embodiment of column 236 illustrated in FIG. 10, each column 236*b* includes a continuous outer housing 260 having an airfoil configuration so as to minimize pressure loss in bypass air 32 flowing past the columns. In FIG. 10 a portion of housing 260 has been removed to reveal hollow interior 262 thereof and elements positioned in the interior. Each hollow interior 262 is divided along the long axis of the column 236 into portions 262a and 262b by an interior partition 264. The latter terminates prior to outer end 266 of housing 260 so as to permit core air 42 in interior portion 262a to travel into interior portion 262b, as described in more detail below. Preferably, a plurality of turbulence promoting members 270 are provided in interior 262, attached to partition 264, the inner surface of housing 260, or both. In addition, a plurality of heat transfer members 272 is preferably provided in interior 262 for transferring heat in core air 42 traveling in interior 262 to housing 260. Heat transfer members 272 are preferably attached to the inner surface of housing 260.

Interior portion 262a of column 236b is in fluid communication with the hollow interior of diffuser 230 and interior portion 262b is in fluid communication with the hollow interior of collector 232. As a result, as described in more detail below, core air 42 is transported radially outwardly through diffuser 230, radially or dihedrally outwardly through interior portion As described above relative to counterflow intercooler 120, diffuser 230, collector 232, columns 236 and other portions of radial flow intercooler 220 are preferably made from materials that provide an appropriate balance of strength, heat transfer capability, minimal weight, resistance to creep and impact damage at temperatures in the range 600° F. and 1,500° F., and other factors known to those skilled in the art. Suitable materials for counterflow intercooler 220 include titanium and carbon-carbon composites.

In FIG. 5 the entire mass flow of core air 42 exhausted from high pressure compressor first section 82 is shown transported via diffuser 230 to radial flow intercooler 220. Maximum cooling of core air 42 is accomplished under such conditions, as described in more detail below. However, it is to be appreciated that a relatively small portion of core air 42 may be bled off prior to delivery of the core air to intercooler 220, as described above relative to engine 20. Thus, the present invention encompasses: (a) the transport of all the core air 42 in core air passage 40 to radial flow intercooler 220, (b) the transport of 80% to 98% of the core air in the core air passage to the radial flow intercooler, with the remainder being used as bleed mass flow for various purposes, as described above, and (c) the transport of more than the maximum bleed mass flow amount known in the prior art, i.e., more than about 10–12% of the core air in core air passage to the radial flow intercooler. This 10–12% bleed mass flow amount does not inlcude compressor section matching at off-design conditions or the use of high pressure compressor delivery air.

Referring now to FIGS. 6–10 in connection with the description of the operation of turbofan engine 200, with the exception of the transport of core air 42 through radial intercooler 220, engines 20 and 200 operate in identical manner. Thus, attention is directed to the description of engine 20 provided above in connection with the following description of engine 200.

Compressed core air 42 discharged from outlet 84 of first section 82 of high pressure compressor 80 is transported radially outwardly by diffuser 230 for discharge into columns 236. With respect to columns 236a (FIG. 9), core air 42 delivered through diffuser 230 travels outwardly through interior 252 of heat exchange element portion 250a, transversely through the interior of portion 250c and inwardly through the interior of portion 250b into collector 232.

Thermal energy in core air 42 is transferred to heat exchange elements 250, which in turn transfer such thermal energy to fins 256. As noted above, bypass air 32, which is relatively cool as compared to core air 42 in heat transfer elements 250 since it is at a lower pressure, travels through interior 252 of the heat transfer elements. As a result, heat is transferred from heat exchange elements 250 and fins 256 to bypass air 32, which cools the heat exchange elements and the fins, which in turn cools core air 42 traveling through the heat transfer elements. The heated bypass air 32 continues traveling through bypass passage 30 and is ultimately discharged as a low-pressure jet of air through bypass exhaust nozzle 34.

Core air 42 exits heat transfer elements 250, and travels into collector 232. From there, core air 42 is delivered to second section 86 of high pressure compressor 80 where it is further pressurized and then discharged into combustion chamber 100, as described above.

Considering the embodiment of columns 236 illustrated in FIG. 10, i.e., columns 236b, core air 42 travels outwardly through interior portion 262a, contacts the inner surface of outer end 266 whereby its direction is translated so as to pass over the outer end of partition 264 and then travel inwardly through interior portion 262b. Flow promoting members 270 break up laminar or low turbulance flow of core air 42 centered around partition 264 so as to promote contact of the core air with the inner surface of outer housing 260 and with heat transfer members 272. As a result, a greater portion of the thermal energy in core air 42 is transferred to outer housing 260. Thermal energy is transferred to bypass air 32 flowing past housing 260 in the manner described above relative to heat exchange elements 250.

Core air 42 is then transported via collector 232 to second section 86 of high pressure compressor 80 where it is further pressurized and then discharged into combustion chamber 100, as described above.

Figure 11:
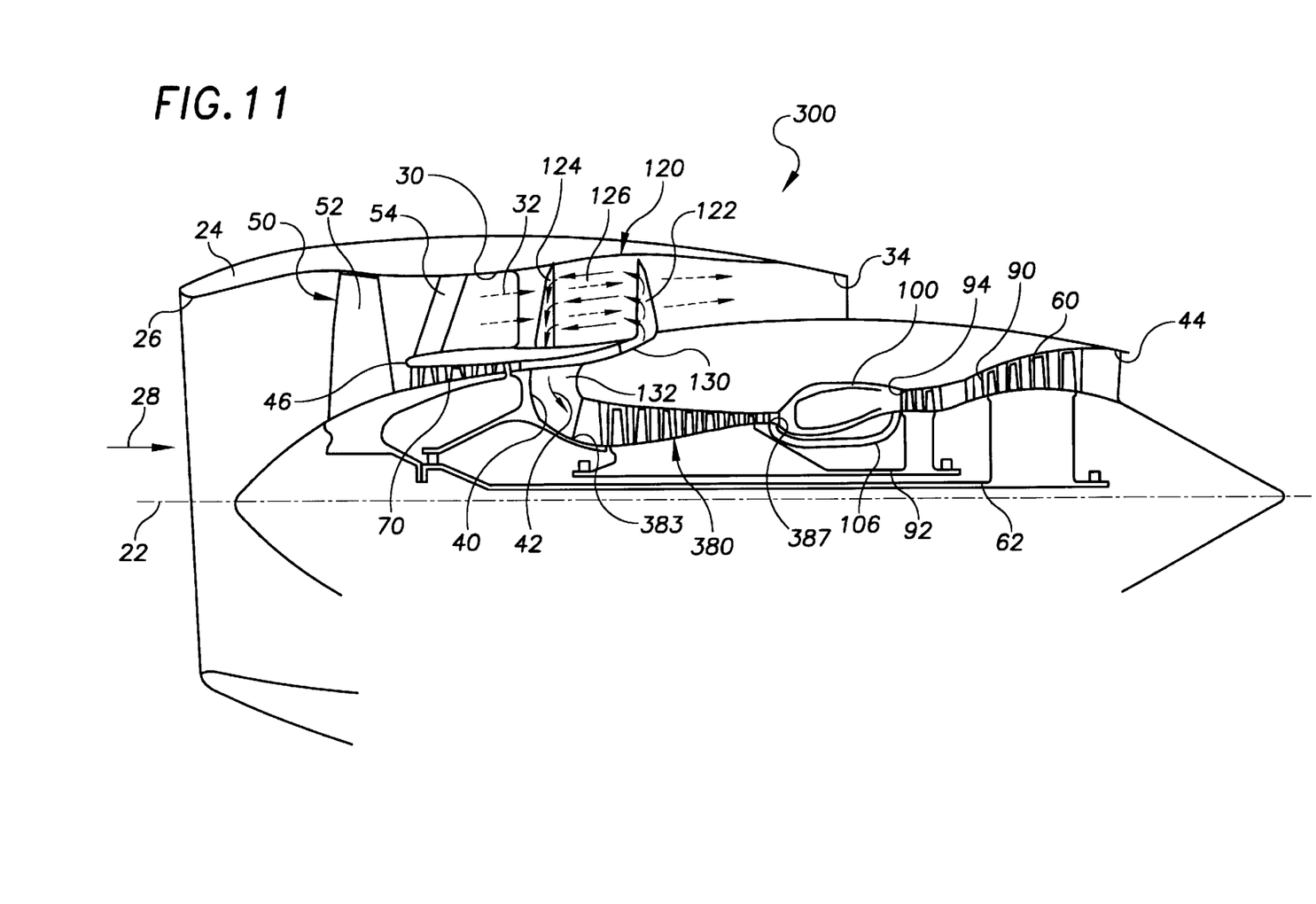
FIG. 11 is a cross-sectional view of the turbofan engine of the present invention, having a counterflow intercooler positioned before the high pressure compressor.

Referring now to FIG. 11, yet another aspect of the present invention is turbofan engine 300. The latter is identical to turbofan engine 20, except that it comprises a single section high pressure compressor 380 in place of two-section high pressure compressor 80. High pressure compressor 380 has an inlet 383 and an outlet 387. Diffuser 130 and collector 132 are positioned between low pressure compressor 70 and high pressure compressor 380. In this regard, core air 42 discharged from low pressure compressor 70 is cooled in counterflow intercooler 120 and is returned to inlet 383 of high pressure compressor 380. Conduit 106 transports a portion of compressed core air 42 discharged via outlet 387 to high pressure turbine 90, as described above. Attention is directed to the description of engine 20 presented above for a more complete description of the structure and function of engine 300.

Figure 12:
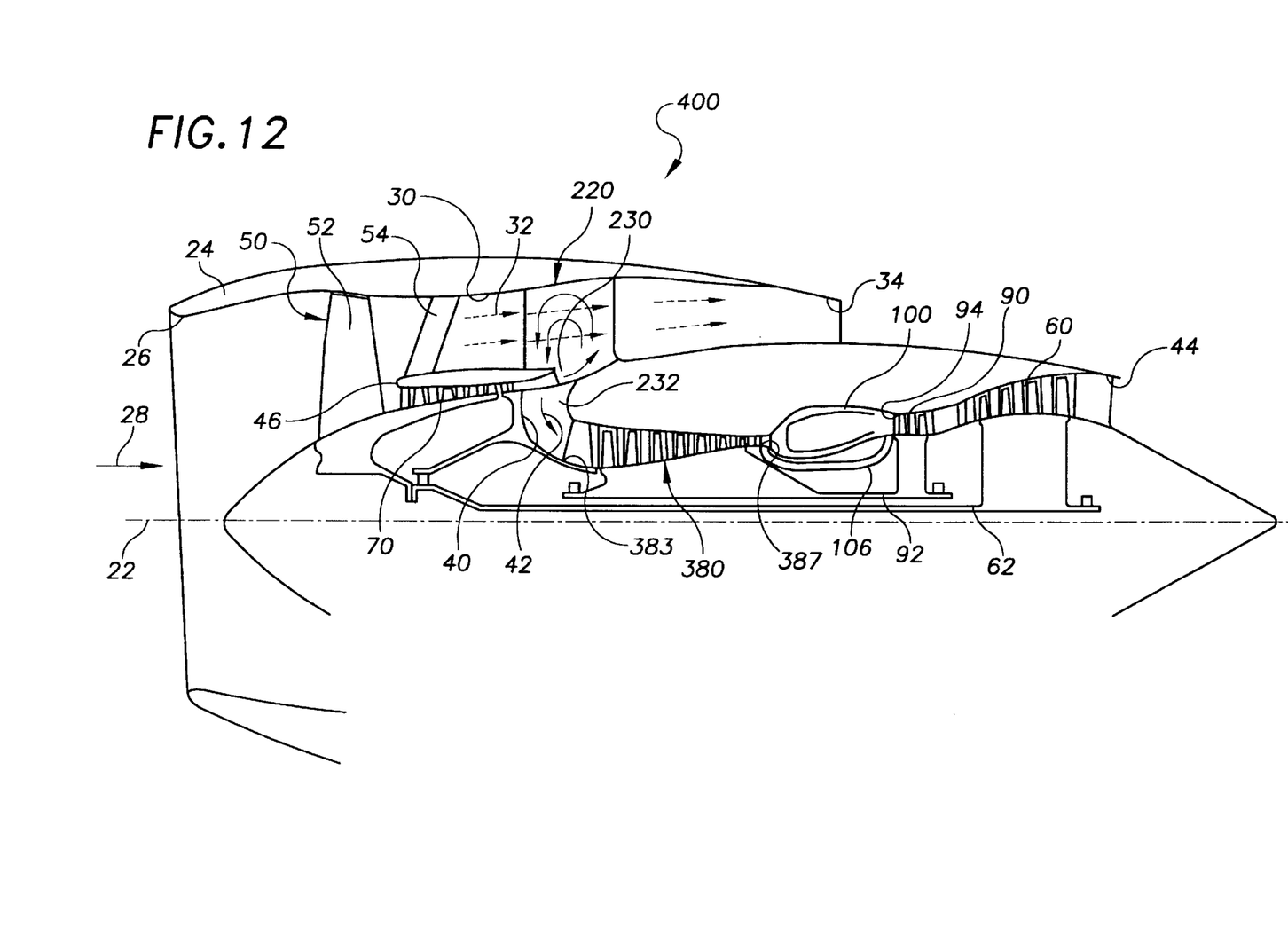
FIG. 12 is a cross-sectional view of the turbofan engine of the present invention, having a radial flow intercooler positioned before the high pressure compressor.

Referring now to FIG. 12, yet another aspect of the present invention is turbofan engine 400. The latter is identical to turbofan engine 300, except that it comprises radial flow intercooler 220 in place of counterflow intercooler 120. Attention is directed to the description of engines 20, 200 and 300 presented above for a more complete description of the structure and function of engine 400.

An important advantage of the various embodiments of the turbofan engines of the present invention is that CPRs significantly in excess of those achieved today, i.e., a maximum of about 25 for supersonic applications and 45 for subsonic applications, may be achieved with the present invention. Analysis suggests CPRs of 70 for supersonic applications and 100 for subsonic (including stationary) applications, or higher, may be achieved with the present invention.

While the present invention has been described in the context of a turbofan engine, it is to be appreciated the invention has application in other turbine engines having core and bypass air passages, including turboshaft and turboprop engines. Thus, while particular embodiments of the invention are disclosed herein, it is not intended to limit the invention to such disclosure, and changes and modifications may be incorporated and embodied within the scope of the following claims.

What is claimed is:

1. A turbine engine that produces thrust, comprising:
    a. a low pressure compressor:
    b. a core air passage through which core air flows;
    c. a high pressure compressor connected to said core air passage, said high pressure compressor having an outlet;
    d. a bypass air passage through which bypass air flows, said bypass air having less thermal energy than said core air;
    e. an intercooler connected to said core air passage and extending into said bypass air passage, wherein said intercooler is constructed to transport more than a mass bleed flow amount of said core air comprising at least twelve percent, by mass, of said core air from said core air passage through said bypass air passage, where thermal energy from said core air is extracted, and back to said core air passage, upstream of said outlet, in a single thermodynamic cycle; and
    f. wherein said bypass air passage is constructed such that said extracted thermal energy contributes to the thrust of the turbine engine.

2. A turbine engine according to claim 1, wherein said intercooler is constructed to transport all of said core air flow from said core air passage through said bypass air passage and back to said core air passage.

3. A turbine engine according to claim 1, wherein said intercooler is constructed to transport all but a bleed flow portion of said core air flow from said core air passage through said bypass air passage and back to said core air passage.

4. A turbine engine according to claim 1, wherein said intercooler includes a plurality of heat exchange elements through which said core air flow is transported.

5. A turbine engine according to claim 4, wherein said bypass air flow travels substantially parallel to a first axis in a first direction, further wherein said plurality of heat exchange elements is positioned so that said core air flow is transported therethrough along axes extending substantially parallel to said first axis.

6. A turbine engine according to claim 5, wherein said plurality of heat exchange elements is positioned so that said core air flow transported therethrough travels in said first direction.

7. A turbine engine according to claim 5, wherein said plurality of heat exchange elements is positioned so that said core air flow transported therethrough travels in a direction opposite said first direction.

8. A turbine engine according to claim 4, wherein said bypass air flow travels substantially parallel to a first axis, further wherein said plurality of heat exchange elements is positioned so that said core air flow is transported therethrough along axes extending transversely to said first axis.

9. A turbine engine according to claim 4, wherein said bypass air flow travels substantially parallel to a first axis, further wherein each of said plurality of heat exchange elements has a central axis, further wherein said plurality of heat exchange elements are positioned so that said central axes extend in directions relative to radii of said first axis that are selected so that said heat exchange elements introduce as little change as possible to bypass air flowing past said heat exchange elements.

10. A turbine engine according to claim 1, wherein said intercooler comprises:
    a. a plurality of hollow heat exchange elements for transporting said core air flow, said plurality of hollow heat exchange members having an inlet end and an outlet end;
    b. an inlet header coupling said core air passage with said inlet end of said plurality of hollow heat exchange elements; and
    c. an outlet header coupling said core air passage with said outlet end of said plurality of hollow heat exchange elements.

11. A turbine engine according to claim 1, further comprising:
    g. a high pressure compressor connected to said core air passage for compressing said core air, said high pressure compressor having a first section for providing partially compressed core air and a second section for providing additionally compressed core air; and
    h. wherein said intercooler is connected to said core air passage to receive said partially compressed core air and to provide said partially compressed core air to said second section following transport through said bypass passage.

12. A turbine engine according to claim 1, further comprising:
    d. a high pressure turbine; and
    e. a conduit connected with said core passage for delivering a portion of said core air to said high pressure turbine after transport of said core air through said bypass passage.

13. A turbine engine according to claim 12, further comprising:
    g. a high pressure compressor connected to said core passage for compressing said core air, some of which comprises said portion of core air;
    h. a combustion chamber connected to said high pressure compressor for receiving compressed core air from said high pressure compressor and providing a gas jet to said high pressure turbine; and
    i. wherein said conduit is positioned to transport said portion of core air past said combustion chamber to said high pressure turbine.

14. A turbine engine according to claim 1, wherein the engine has a CPR of at least 40.

15. A turbine engine comprising:
    a. a low pressure compressor;
    b. a core air passage for transporting a flow of core air;
    c. a high pressure compressor connected to said core air passage;
    d. a bypass air passage for transporting a flow of bypass air in a first direction;
    e. a high pressure turbine; and
    f. intercooler means, connected to said core air passage and extending into said bypass air passage, for cooling at least a portion of said flow of core air in a single thermodynamic cycle sufficiently that delivery of at least some of said cooled flow of core air to said high pressure turbine permits TITs in excess of 3,200° F.

16. A turbine engine according to claim 15, wherein said intercooler means includes:
   a. a plurality of heat exchange elements positioned in said bypass air passage, each having a hollow interior and a longitudinal axis extending substantially parallel to said first direction; and
   b. diffuser means for transporting said core air to hollow interiors of said plurality of heat exchange elements and back to said core air passage such that said core air travels in a second direction, which is opposite said first direction, through said heat exchange elements.

17. A turbine engine according to claim 15, wherein said intercooler means includes:
   a. a plurality of heat exchange elements positioned in said bypass air passage, each having a hollow interior and a longitudinal axis extending transversely to said first direction; and
   b. diffuser means for transporting said core air to hollow interiors of said plurality of heat exchange elements and back to said core air passage such that said core air travels in a third direction, which is transverse to said first direction, through said heat exchange elements.

18. A turbine engine according to claim 15, further comprising:
   g. a combustion chamber for providing a gas jet;
   h. a high pressure turbine rotatably mounted so as to be rotatably driven by said gas jet, said turbine being made from materials that experience creep above a first temperature;
   i. a conduit for delivering a portion of said core air, following transport through said intercooler means, to said high pressure turbine; and
   j. wherein said intercooler means cools said core air sufficiently that said portion of said core air is capable of cooling said high pressure turbine sufficiently to permit introduction of said gas jet at a temperature in excess of said first temperature.

19. A turbine engine according to claim 15, wherein said first temperature is 3,200° F.

20. A turbine engine according to claim 15, wherein said intercooler means transports said core air to and from said bypass passage before being compressed by said high pressure compressor.

21. A turbine engine according to claim 15, further wherein said high pressure compressor has a first section for partially compressing said core air and a second section for additionally compressing said core air, wherein said intercooler means transports said core air to and from said bypass passage before being additionally compressed by said second section.

22. A turbine engine comprising:
   a. a core air passage for transporting a flow of core air;
   b. a bypass air passage for transporting a flow of bypass air that has less thermal energy than said core air;
   c. a high pressure compressor for compressing said core air and discharging said compressed core air, said high pressure compressor having an outlet through which said compressed core air is discharged;
   d. an intercooler connected to said core air passage and constructed to transport at least a portion of said core air from said core air passage through said bypass air passage and back to said core air passage prior to discharge of said compressed core air through said outlet so as to cool said core air in a single thermodynamic cycle substantially without loss of thermal energy from the turbine engine; and
   e. wherein said high pressure compressor is designed to compress said core air sufficiently that the engine has a CPR of at least 30 when designed for supersonic applications or at least 50 when designed for subsonic applications.

23. A turbine engine according to claim 22, wherein said high pressure compressor is designed to compress said core air sufficiently that the engine has a CPR of at least 50 when designed for supersonic applications or at least 75 when designed for subsonic applications.

24. A turbine engine according to claim 22, wherein said high pressure compressor is designed to compress said core air sufficiently that the engine has a CPR of at least 70 when designed for supersonic applications or at least 100 when designed for subsonic applications.

25. A turbine engine according to claim 22, further comprising:
   f. a combustion chamber connected to said high pressure compressor for providing a gas jet;
   g. a high pressure turbine rotatably mounted so as to be rotatably driven by said gas jet, said high pressure turbine having an inlet; and
   h. a conduit connected to said outlet of said high pressure compressor and said inlet of said high pressure compressor for delivering a portion of said compressed core air to said inlet.

26. A turbine engine according to claim 25 wherein said high pressure compressor has two sections.

* * * * *